(12) United States Patent
Sevindik et al.

(10) Patent No.: US 9,282,477 B2
(45) Date of Patent: Mar. 8, 2016

(54) MODIFYING LOG FILES AND PLAYBACK FILES USED FOR WIRELESS NETWORK EMULATION

(71) Applicant: Azimuth Systems, Inc., Acton, MA (US)

(72) Inventors: Volkan Sevindik, Wellesley Hills, MA (US); Deepak Das, Arlington, MA (US); Pattabhi Ram Cherukuri, Malden, MA (US)

(73) Assignee: AZIMUTH SYSTEMS, INC., Acton, MA (US)

( * ) Notice: Subject to any disclaimer, the term of this patent is extended or adjusted under 35 U.S.C. 154(b) by 223 days.

(21) Appl. No.: 13/956,756

(22) Filed: Aug. 1, 2013

(65) Prior Publication Data

US 2014/0024318 A1 Jan. 23, 2014

Related U.S. Application Data

(63) Continuation-in-part of application No. 13/655,646, filed on Oct. 19, 2012.

(60) Provisional application No. 61/549,399, filed on Oct. 20, 2011, provisional application No. 61/703,887, filed on Sep. 21, 2012, provisional application No. 61/703,897, filed on Sep. 21, 2012.

(51) Int. Cl.
*H04W 24/00* (2009.01)
*H04W 24/06* (2009.01)
*H04B 17/00* (2015.01)
*H04W 16/22* (2009.01)

(52) U.S. Cl.
CPC .............. *H04W 24/06* (2013.01); *H04W 16/22* (2013.01)

(58) Field of Classification Search
CPC ............. H04B 17/0087; H04B 17/327; H04B 17/3911; H04W 16/22; H04W 24/06; H04W 24/00
USPC ............................ 455/67.11, 67.14, 423, 424
See application file for complete search history.

(56) References Cited

U.S. PATENT DOCUMENTS

| 2004/0233852 | A1* | 11/2004 | Ochi et al. | 370/242 |
| 2006/0202834 | A1* | 9/2006 | Moriwaki | 340/573.1 |
| 2007/0127559 | A1* | 6/2007 | Chang | 375/213 |

* cited by examiner

*Primary Examiner* — Ayodeji Ayotunde
(74) *Attorney, Agent, or Firm* — Anderson Gorecki & Rouille LLP

(57) ABSTRACT

Missing or unwanted parameter data indicative of wireless network conditions in a log file or playback file is replaced with substitute parameter data. The substitute parameter data can be calculated based on other data in the log file or playback file, selected from pre-defined data in storage, and provided by a user. The substitute parameter data may also be customized by the user via an interface.

27 Claims, 10 Drawing Sheets

Event Selection

MODIFYING LOG FILES AND PLAYBACK FILES USED FOR WIRELESS NETWORK EMULATION

CROSS-REFERENCE TO RELATED APPLICATIONS

This application is a continuation-in-part of U.S. patent application Ser. No. 13/655,646, entitled SIGNAL SEGMENTATION, EVENT RECOGNITION, EXTRACTION AND CLASSIFICATION FOR EMULATING WIRELESS NETWORK, filed Oct. 19, 2012, which claims priority to U.S. Provisional Patent Application 61/549,399, entitled RISING PILOT, filed Oct. 20, 2011, and also to U.S. Provisional Patent Application 61/703,887, entitled SIGNAL SEGMENTATION, EVENT RECOGNITION, EXTRACTION AND CLASSIFICATION FOR EMULATING WIRELESS NETWORK, filed Sep. 21, 2012, each of which is incorporated by reference; priority is also claimed to U.S. Provisional Patent Application. 61/703,897, entitled Custom Enhancements and Extensions to RF Playback based on Field logs in the Lab, filed Sep. 21, 2012.

BACKGROUND OF THE INVENTION

This invention is generally related to test equipment, and more particularly to test equipment for wireless network emulation. Cellular networks and Wireless Local Area Networks ("WLANs") enable communications between mobile wireless devices such as user terminals (UEs), which can include mobile phones and portable computers, and fixed location wireless devices such as access points and base stations. It is standard practice to test the performance of such devices under various network conditions. Testing wireless devices in an open environment is notoriously difficult because wireless communications can be affected by ambient sources of interference. However, it is now relatively common to use system level network emulators to perform wireless device testing in a controlled environment. One type of emulator includes a separate container for each wireless device to shield against external electromagnetic interference (EMI). Communications are converted from wireless radio frequency (RF) to wired signals, and the containers are placed in communication via wired connections. A channel emulator connected between the containers subjects the communications to simulated physical environmental effects.

Various types of tests can be performed with a channel emulator. For example, the tests can be designed to create either hypothetical conditions or recreate realistic conditions. One type of realistic test is system level network emulation. In a system level emulation the system level network conditions experienced by a wireless network are recorded and subsequently recreated in the lab using the channel emulator. More particularly, the conditions are recorded in log files saved by different components of the telecommunication network. These logs are synchronized, combined and processed to create a playback file which is used to recreate the real network behavior. The recreated conditions emulate the telecommunication network in terms of number of available sectors and pilot signals, power of pilot signals, received signal power levels, and signal-to-noise-plus-interference ratio (SNIR). Such an emulation can be used for evaluation of access events such as random access of the network, connection events such as call drops, mobility events such as handoff, average sector throughput, average delay, average network throughput, and the performance of different traffic types such as best effort (BE), expedited forwarding (EF), and assured forwarding (AF).

SUMMARY OF THE INVENTION

Some aspects of the invention are predicated in part on recognition that log files and playback files may contain undesirable data segments such as discontinuities associated with packet loss and compressed mode operation.

According to an aspect of the invention, a method comprises: using a computer, identifying an occurrence of parameter data to be replaced in a file indicative of wireless network conditions; providing substitute parameter data corresponding to the occurrence of parameter data to be replaced; replacing the occurrence with the substitute parameter data; and using a channel emulator, recreating wireless network conditions based on a corresponding file generated with the substitute parameter data.

According to another aspect of the invention, an apparatus comprises: computing resources which identify an occurrence of parameter data to be replaced in a file indicative of wireless network conditions, provide substitute parameter data corresponding to the occurrence of parameter data to be replaced, and replace the occurrence with the substitute parameter data; and a channel emulator which recreates wireless network conditions based on a corresponding file generated with the substitute parameter data.

According to another aspect of the invention a computer program on a non-transitory computer-readable medium comprises: instructions used by a computer to identify an occurrence of parameter data to be replaced in a file indicative of wireless network conditions, provide substitute parameter data corresponding to the occurrence of parameter data to be replaced, and replace the occurrence with the substitute parameter data; and instructions used by a channel emulator to recreate wireless network conditions based on a corresponding file generated with the substitute parameter data.

At least some aspects help improve testing of wireless devices. Log files recorded outside the lab may include segments of undesirable or missing data due to packet loss, gaps associated with compressed mode operation, and other instances of unwanted or troublesome discontinuities. Similarly, a playback file may include discontinuities between events. These problems can be avoided, and a more meaningful transition provided, by inserting substitute parameter data where problematic segments of parameter data are detected. The substitute parameter data can be calculated based on other data in the file, obtained from a database of predefined parameter data, inserted by a user, modified automatically, modified by a user, and any combination thereof.

DETAILED DESCRIPTION

Figure 1:
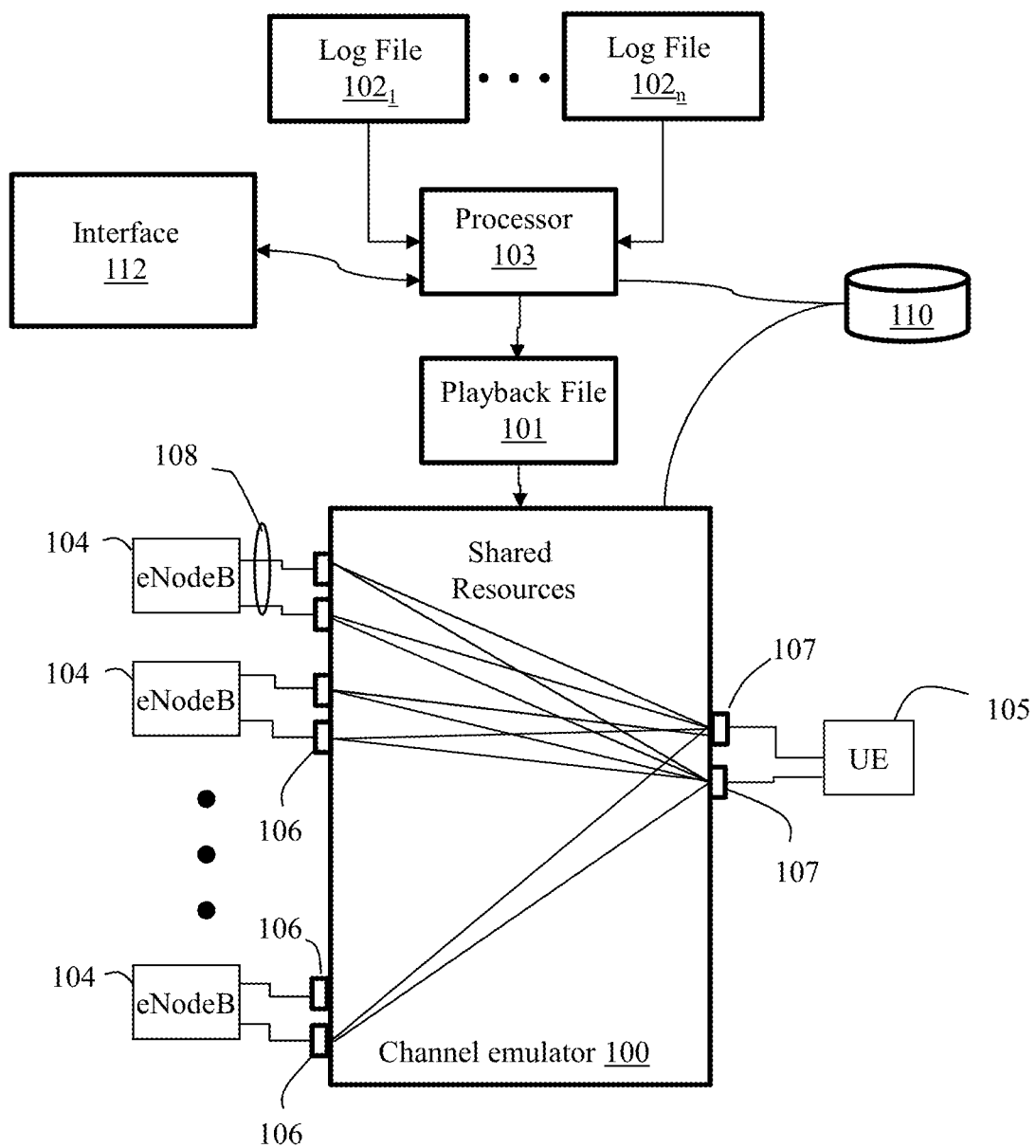
FIG. 1 illustrates a channel emulator for testing wireless devices in a controlled environment.

FIG. 1 illustrates a channel emulator 100 for performing wireless device testing in a controlled environment. Certain functions may be performed with processing hardware using computer program code stored on non-transitory computer readable media 110. The channel emulator is operable to interconnect a set of two or more wireless devices in order to simulate effects on communications between the devices by using various shared resources. More particularly, the channel emulator functions to recreate conditions which are described by a playback file 101. The playback file 101 is created by a processor 103 from hypothetical scenarios or one or more log files $102_1$ through $102_n$ created by devices of a real telecommunication network. The log files contain network performance indicators which may include but are not limited to one or more of power measurements (e.g., interference, noise, signal-to-noise ratio (SNR), received signal strength indicator (RSSI), and multipath Power-Delay-Profile), multiple-input multiple-output (MIMO) correlation, cell information, sector information, location information, data rate, throughput, wireless channel signal quality, and handoff parameters. The wireless devices are shown to include user equipment (UE) 105 and next generation evolved base stations (eNodeB) 104, but a wide variety of specific devices might be used including but not limited to wireless phones, portable computers, base stations, base station controllers, and diagnostic monitors. The wireless devices may be disposed in separate housings which provide shielding from external EMI, thereby enabling testing in a relatively small space. External cabling 108 is employed by the user in place of antennas to connect the wireless devices to ports on the channel emulator 100. In the illustrated example, each port 106 is associated with a particular antenna port of the base station 104 to which it is connected by a cable, and each port 107 is associated with a particular antenna port of the UE 105 to which it is connected by a cable. An interface 112 is provided for presenting data such as the log files and playback file to an operator and external applications and also allows the operator to input settings to the processor. For example, data can be presented graphically on a display and also in a data file. The interface also functions to receive an external indication of event recognition, e.g., manual event recognition by an operator or automated event recognition by external applications.

The signals transmitted between devices such as UEs 105 and base stations 104 are selectively modified by the shared resources of the channel emulator 100 in order to simulate effects including but not limited to multipath reflections, delay spread, angle of arrival, power angular spread, angle of departure, antenna spacing, antenna geometry, Doppler from moving vehicle, Doppler from changing environments, path loss, shadow fading effects, reflections in clusters and external interference such as radar signals, phone transmission and other wireless signals or noise. Furthermore, the channel emulator creates conditions that will provide to the device under test conditions such as number of available sectors and pilot signals, power of pilot those signals, received power levels, signal-to-noise-plus-interference ratio (SNIR), and hand-off situations. These conditions can be used to evaluate aspects of performance such as average sector throughput, average delay, average network throughput, and the performance of different traffic types such as best effort (BE), expedited forwarding (EF), and assured forwarding (AF). Conditions are described by the playback file such that the playback file indicates to the channel emulator how to control the shared resources.

Figure 2:
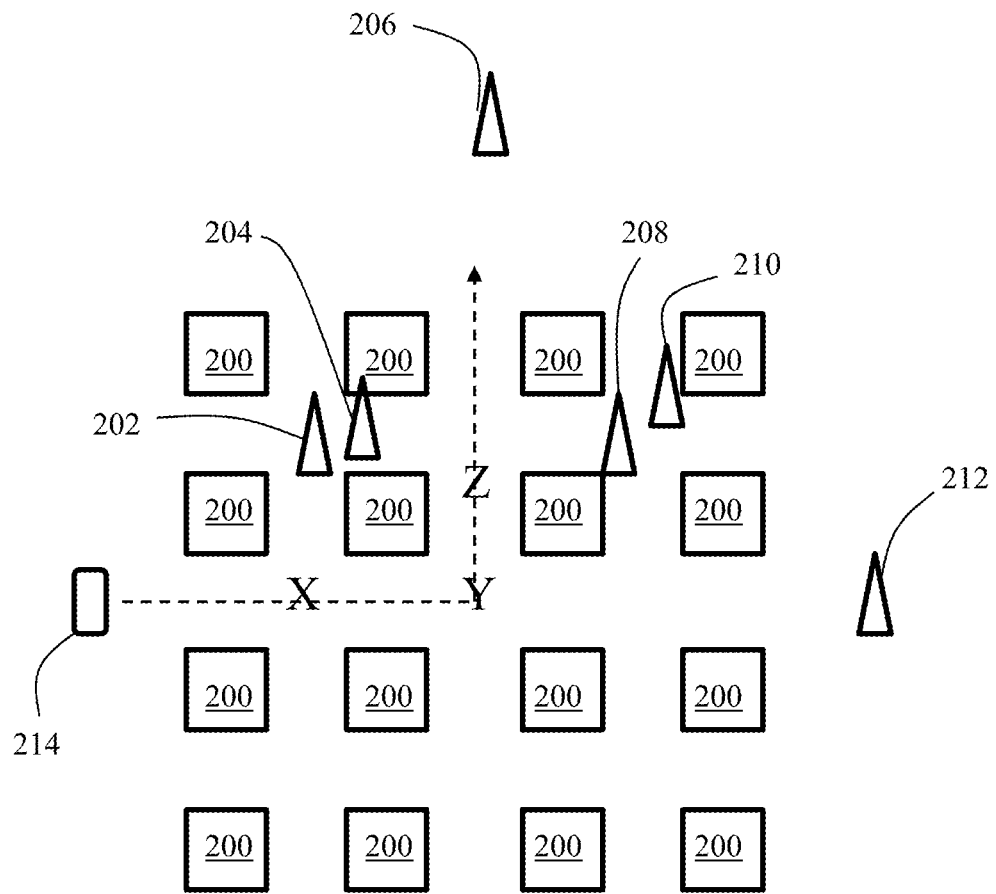
FIG. 2 represents a simplified urban environment from which real experienced system level network conditions are logged.

FIG. 2 represents a real yet simplified urban environment for which system level network conditions are logged, thereby creating log files. Signals tend to reflect from some surfaces and arrive at a destination via multiple paths, but in this simplified environment those effects are not considered in order to provide a more readily understandable description. The illustrated environment includes obstructions such as buildings 200, and base stations 202-212 via which a UE 214 can obtain network connectivity. In the illustrated example the UE may initially detect only base station 212 due to obstructions to the other base stations. However, at point X the UE detects base station 202 as well as 212. Furthermore, the signal from base station 202 may be greater than that of base station 212 as measured by the UE 214. The log files are created as the UE 214 is moved through the environment in order to record actual conditions as experienced by the UE and other devices, e.g., base stations 202-212.

Figure 3:
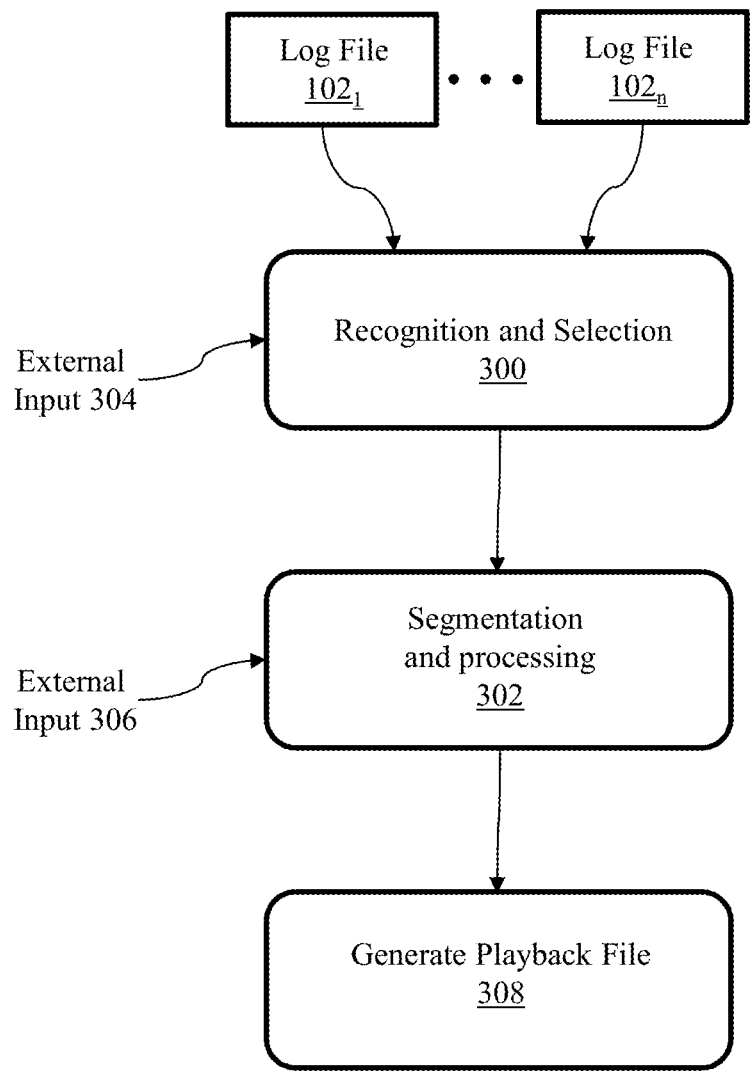
FIG. 3 illustrates playback file generation.

Referring to FIGS. 1 and 3, processor 103 generates the playback file 101 from one or more of the log files $102_1$ through $102_n$. A first step 300 in generating the playback file is event recognition and selection. The term "event" is used broadly in this disclosure. An event may be any situation, signal or feature that can be characterized by recognizable properties, including but not limited to a call drop, handover, period during which capacity, QoS or coverage is sub-optimal, where resource management issues occur, where unique modulation, channel quality information (CQI) power measurement, reporting, or resource block distribution patterns occur. Moreover, an event may include multiple situations, signals and features. Events can be recognized automatically by parsing log files for recognizable features or patterns. External input 304 may also or alternatively be utilized, e.g., users can recognize events via interface 112. External and internal event recognition may include an indication of event type and event start and stop times. Once the events have been recognized, one or more of the recognized events is selected. As will be explained in greater detail below, event selection may be partially or completely automated. Event selection may also occur externally (with external input 304), internally or both. The next step 302 is event segmentation and processing. Segmentation is a procedure by which data associated with the selected events is copied to a new memory location, thereby distinguishing it from other data in the log files. Events which are segmented from a log file may be processed using various operations, although this is not a requirement. Segmentation and processing may also occur externally (with external input 306), internally or both. For example, an operator can manually segment and process events externally and provide the resulting data to the processor via the interface. Further, the processor may include algorithms for automatic event segmentation and processing. The processor generates the playback file in step 308 from the segmented and possibly processed events by arranging the events and possibly copies of the events in a time succession such that the time between events is controlled, e.g., increased or reduced, and manipulated to avoid unwanted disruptive discontinuity.

Figure 4:
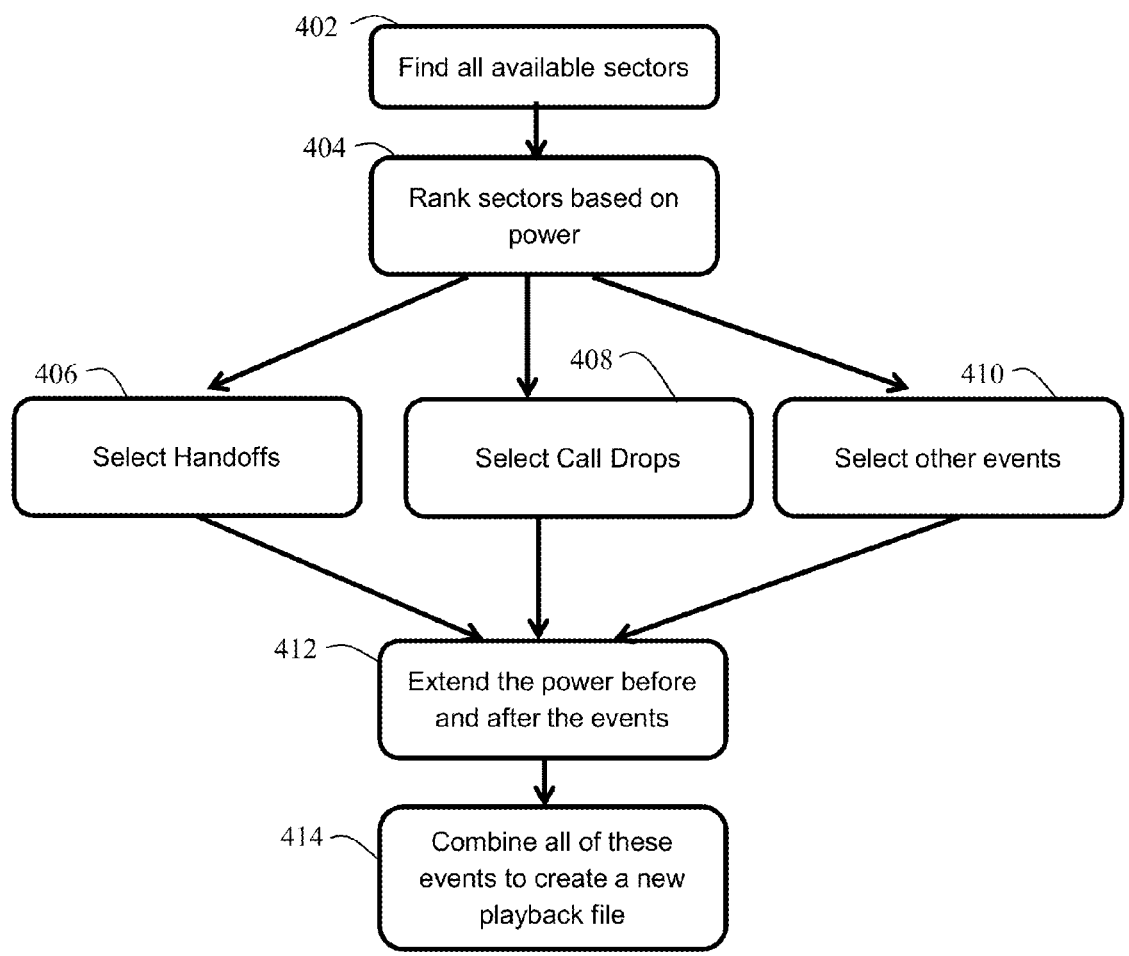
FIG. 4 illustrates event selection in greater detail.

FIG. 4 illustrates aspects of event selection in greater detail. An initial step 402 is to find all available sectors in UE log files which are imported into the software. The available sectors are serving and neighboring sectors as described in telecommunication network standards. The available sectors are ranked based on power and duration in step 404. For average power based ranking, the highest average power sector will be ranked as the first, and second highest average power sector will be ranked as second, and so on. For duration based ranking, the sector that has the greatest duration will be ranked as the first sector, and the sector that has the second greatest duration will be ranked as the second sector, and so on. One or more types of events identified as described above are selected, e.g., select handoffs 406, select call drops 408, and select other (specified) events 410. Depending on the power level and duration of a particular sector, at different moments of time or for some duration of time, a particular sector will be selected. Selection of a particular sector will be denoted by sector ID. A handoff event is identified by a sector ID changing from the current ID to a different sector ID. A call drop event is identified by no sector being played. Selected network events other than handoffs and call drops that user is interested in playing back are also identified. The user may utilize the interface to manually select events or types of events. The process may also be automated internally and using an external application. The indication of selected events is provided to the processor. In the case of automatic event selection by the processor it may still be desirable for the operator to indicate which types of events are of interest. For example, the operator might indicate that handovers are of interest, thereby implicitly indicates that other events are not of interest. The event selection algorithm filters the event list produced by the event recognition algorithm to remove events which are not of interest to the operator. The next step 412 is to extend the power before and after the events. Before and after the handoff point, the duration of the sector may be extended by a percentage that the user defines through the user interface. The total duration of the sector is multiplied by this percentage in order to determine the duration of the sectors before and after the handoff point. The events are combined in step 414 to create a new playback file, e.g., in which the events are presented in series with adequate recovery and transition time between events in order to avoid disruptive discontinuity. In particular, the segments of parameter data associated with identified events are joined in order to create a new scenario represented by the playback file.

Figure 5:
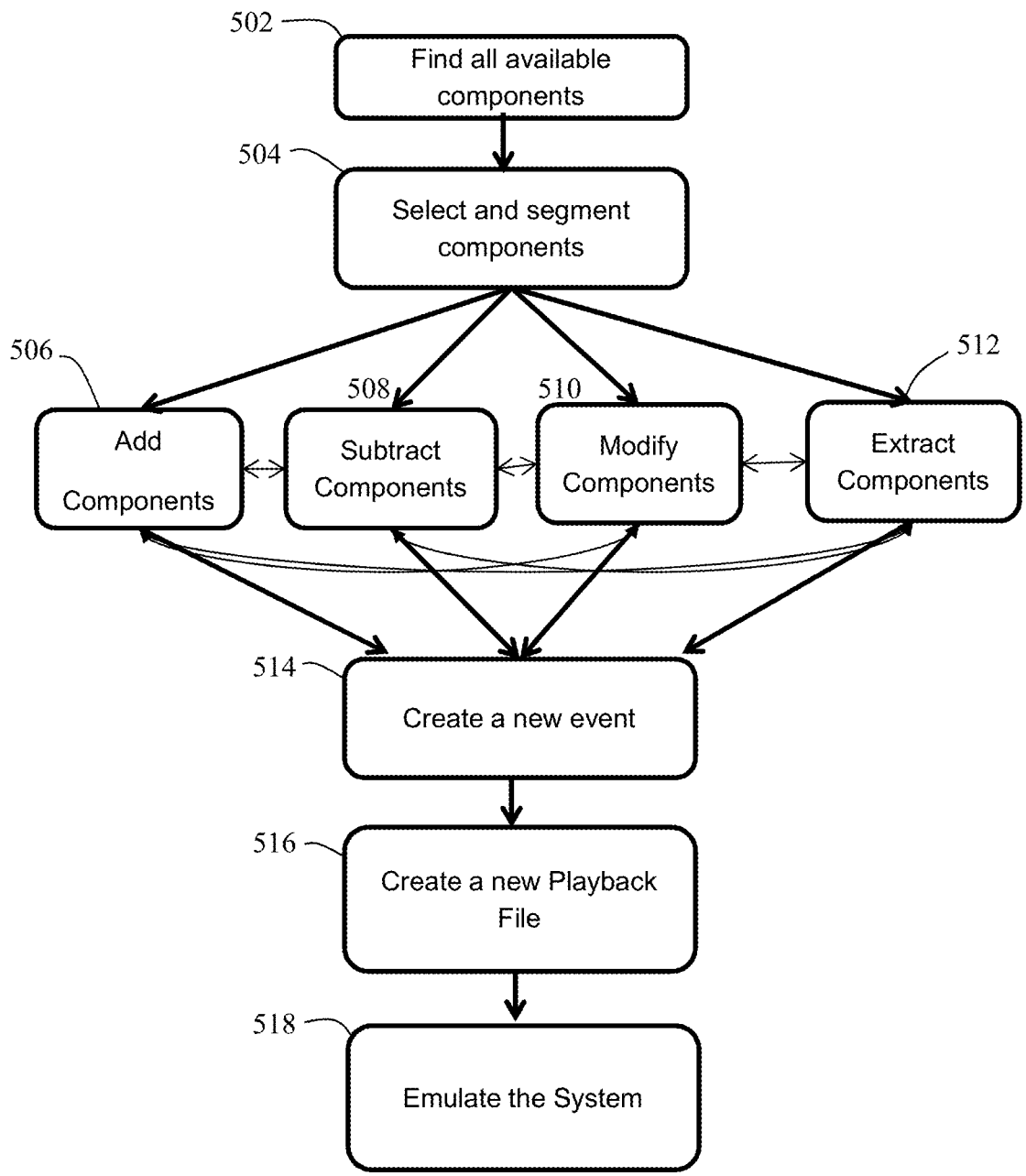
FIG. 5 illustrates segmentation and processing in greater detail.

FIG. 5 illustrates aspects of event processing in greater detail. An initial step 502 is to find all available components associated with the event. A component may be any feature associated with an event, including but not limited to one or more signals. The component need not represent all aspects of the event. For example, an event may include signals associated with various devices during a call drop, and the components may include signals from individual devices. One or more of the components are selected for segmentation in step 504, by which they are distinguished from other data associated with the event (unless the entire event is selected). The step may be manual, automated, or some combination thereof. For example, a user may utilize the interface to manually select components using mouse clicks to select from a list of individual components or types of components. The process may also be automated using an internal or external application. The indication of selected components is provided to the processor. In the case of automatic selection by the processor it may still be desirable for the operator to indicate which components are of interest. For example, the user might indicate that some components are of interest, thereby implicitly indicating that other components are not of interest. A selection algorithm then filters the list of available components to produce a list of selected components. A segmentation algorithm then segments the selected components to remove portions which are not of interest to the user, e.g., by cutting and copying based on a dynamic or static time window. Segmenting the event may also be based on user input through the graphical user interface. The remaining components may then be, but are not necessarily, processed by one or more operations including but not limited to adding components 506, subtracting components 508, modifying components 510, and extracting components 512. Adding 506 may include adding different components of the event (or multiple events) together. Subtraction 508 may include removing one or more components. Modifying 510 may include altering one or more components. Extracting 512 may include selecting a particular part or parts of the selected components. The results are used to create a new signal in step 514. The new signal is used to create a new playback file in step 516, and the new payback file is used to emulate the system in step 518.

Figure 6A:
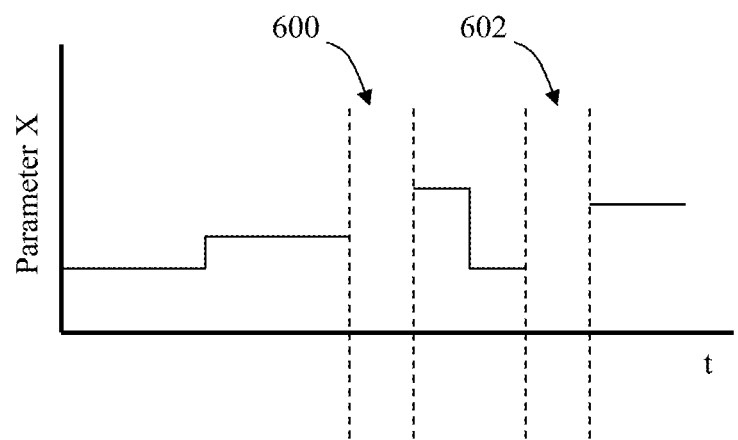
FIG. 6A illustrates a log file with missing sections of parameter data.
Figure 6B:
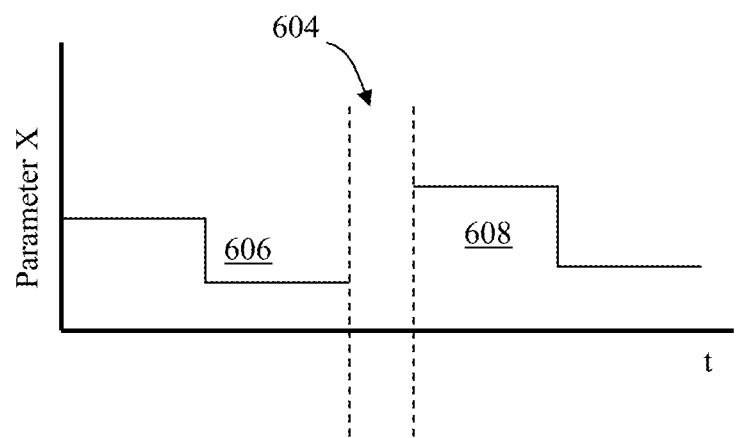
FIG. 6B illustrates a playback file which lacks a transition between adjacent events.

Referring to FIGS. 1, 6A and 6B, in some situations it may be necessary or desirable to modify a log file or playback file via insertion of substitute data associated with one or more parameters including but not limited to power measurements (e.g., interference, noise, signal-to-noise ratio (SNR), received signal strength indicator (RSSI), and multipath Power-Delay-Profile), MIMO correlation, cell information, sector information, location information, data rate, throughput, wireless channel signal quality, and handoff parameters. For example, as specifically shown in FIG. 6A, sections 600, 602 of data associated with one or more parameters may be missing, corrupted or otherwise unwanted or unusable in one of the input log files $102_1$ through $102_n$. Typical causes of missing log file data include missing packets and gaps created pursuant to Compressed Mode (CM) operation. In an inter-Radio-Access-Technology (iRAT) or multi-frequency scenario, for example, CM results in gaps where a mobile device, respectively, performs evaluations prior to migrating from Radio Access Technology A to Radio Access Technology B, or from frequency A to frequency B. In accordance with one aspect, an interval of playback data is provided and inserted to allow for a more meaningful transition from Technology A to Technology B, or from frequency A to frequency B. Somewhat similarly, as specifically shown in FIG. 6B, parameter data may need to be provided to create a transition interval 604 between events 606, 608 in the playback file 101. Without limitation, a meaningful transition may sometimes correspond to a smooth transition. However, a meaningful transition could also be an event. The parameter data for achieving the meaningful transition may be provided in various ways.

Figure 7:
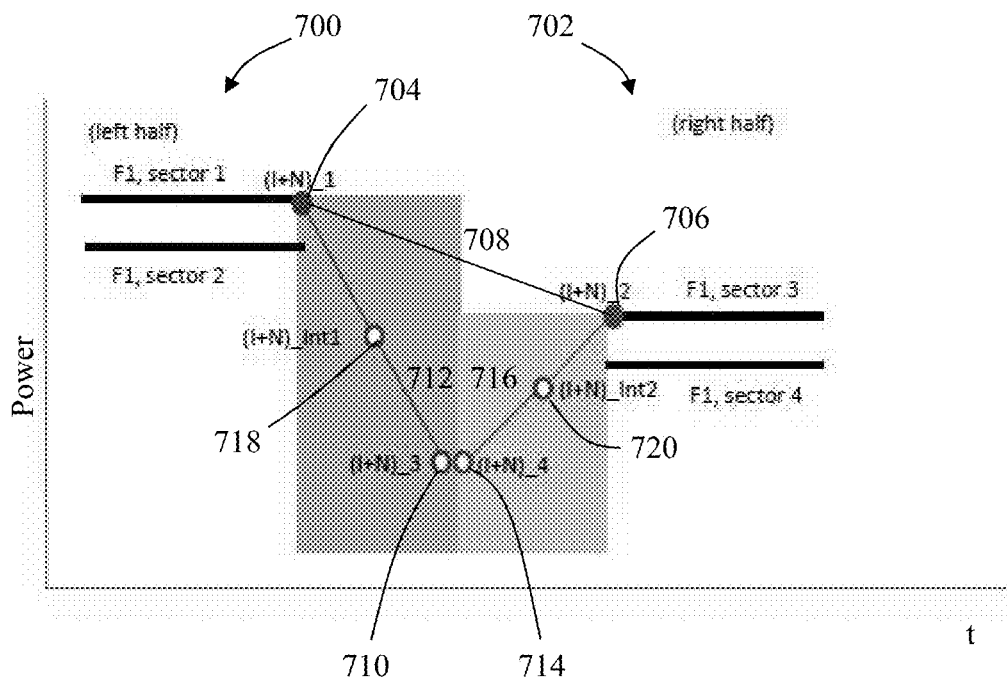
FIG. 7 illustrates parameter data calculation and modification where CM data is not present.

Referring to FIG. 7, sections of substitute parameter data for providing meaningful transitions in log files and playback files may be calculated based on data from sections to be joined. In the illustrated example F1 represents recorded frequency 1 power measurements from a log. A first section 700 of data includes power measurements for frequency 1 from sector 1 and sector 2. A second section 702 of data includes power measurements for frequency 1 from sector 3 and sector 4. One or more data points on each side of the discontinuity between the sections 700, 702 are used to calculate parameter data to provide the meaningful transition. For example, data point 704 and data point 706 can be used to calculate transition 708 based on linear interpolation. Additional data points could be used. For example, data point 704 and data point 710 can be used to calculate transition 712, and data point 714 and data point 706 can be used to calculate transition 716, where data points 710 and 714 are at the same power level and adjacent in time. The transitions 712, 716 are combined to provide a single transition from section 700 to section 702. Data points other than endpoints, e.g., data points 718, 720, may also be utilized in the calculations. Although smooth linear transitions based on interpolation are shown, any of a wide variety of transition functions could be utilized. It should also be noted that the power calculations in the illustrated example include calculation of an associated Interference+Noise term (I+N). In the illustrated example (I+N)_Intx is an interpolated value of the respective end points.

The interface 112 (FIG. 1) can be utilized by the user to modify or otherwise manipulate the calculated transitions. For example, the user can move data point 706 to join sector 4 rather than sector 3. Similarly, the user can move data point 704 to join sector 2 rather than sector 1. Further, the user can move other custom interpolation points 718, 720. In each case an automated recalculation is performed to provide the new parameter data for the modified transition.

Figure 8:
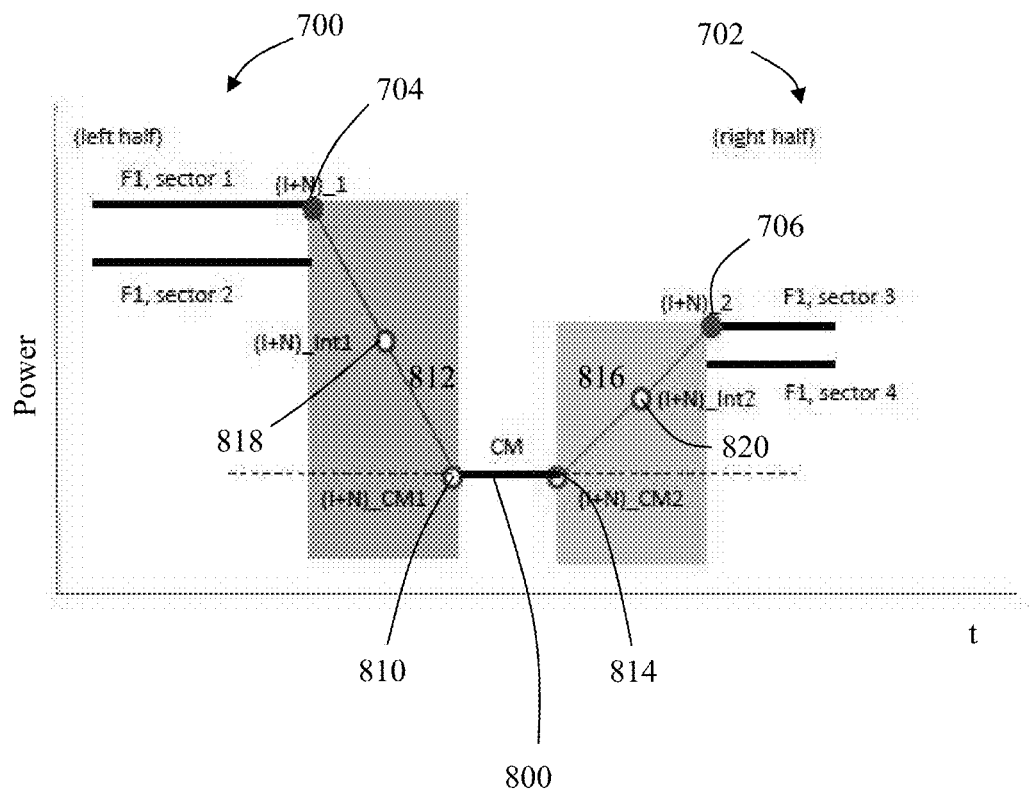
FIG. 8 illustrates parameter data calculation and modification where CM data is present.

Referring to FIG. 8, the technique can also be applied when Compressed Mode (CM) 800 power measurements are present. CM allows a mobile device to perform measurements on access devices other than that with which the UE is currently associated, thereby facilitating handoff to the other access devices. In creating a playback file that has CM measurements, some playback data is calculated to allow for a more meaningful transition, e.g., both from section 700 to CM 800 and from CM 800 to section 702. Discontinuities are presented in a first interval between frequency 1, sector 1 data and CM data, and in a second interval between CM data and frequency 1, sector 3 data. One or more data points on each side of the discontinuity are used to calculate parameter data to provide a meaningful transition. For example, data point 704 and data point 810 can be used to calculate transition 812, and data point 814 and data point 706 can be used to calculate transition 816. Data points other than endpoints, e.g., data points 818, 820, may also be utilized in the calculations. However, the user cannot necessarily move the end interpolation points 810, 814 connecting to the CM data 800. Nevertheless, the user could choose not to use CM measurements and retain the interpolation lines.

Figure 9:
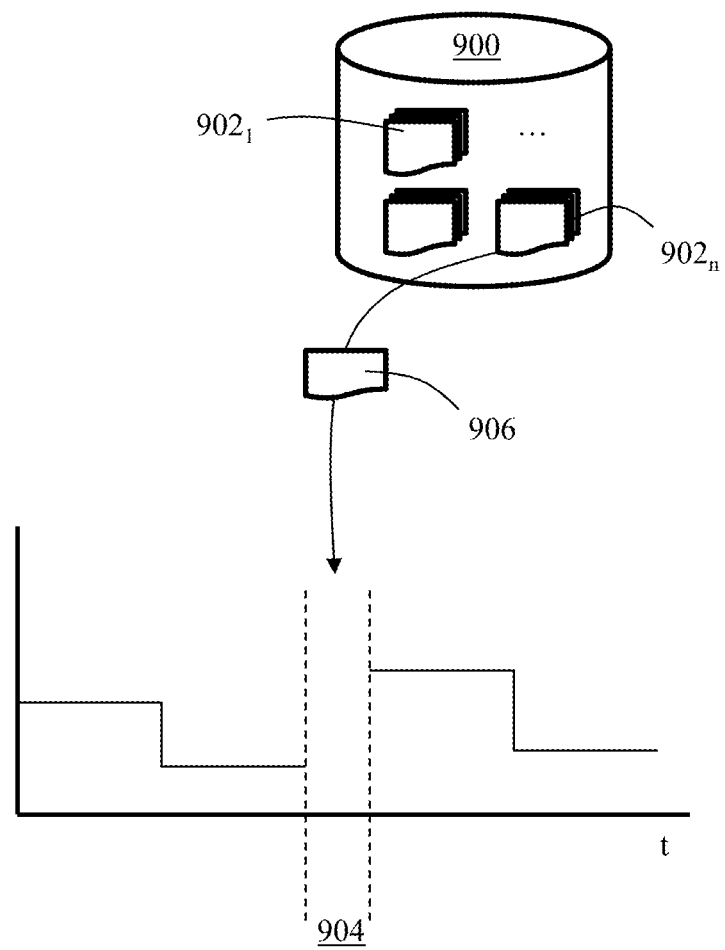
FIG. 9 illustrates insertion of pre-existing parameter data segments from a database.

Referring to FIG. 9, sections of log files and playback files may be replaced with pre-existing substitute parameter data from storage 110 (FIG. 1). A database 900 of substitute parameter data may include different sets $902_1$-$902_n$ of data, e.g., a set for each parameter. Each set may include multiple data records, and each data record may be unique. For example, the data records associated with set $902_1$ may represent various different non-event or event-related parameter variations, e.g., high, low and medium variations of power level, MIMO correlation, etc. When a section of substitute parameter data is required, e.g., to replace a gap 904 associated with missing log file packets or CM operation, a record 906 from one or more sets 902 in the database is selected and inserted, e.g., into the gap. In particular, for each parameter for which data is missing, the corresponding set is utilized to provide substitute parameter data. The record may be selected from the database manually, automatically based on event type (if event related data is required), randomly, according to a round-robin or other balancing algorithm, based on the data points to which it is joined, or by any other of a wide variety of techniques. For example, if there is no MIMO correlation information in the input log file then the user or an algorithm utilized by the processor may select a "HIGH" correlation matrix for the first $3^{rd}$ of the segment to be replaced, a "MEDIUM" correlation matrix for the second $3^{rd}$ of the segment to be replaced and a "LOW" correlation matrix for the last $3^{rd}$ of the segment to be replaced. In one variation specific data records or characteristics selected by the algorithm for use during different time intervals are presented to the user via the interface for confirmation or override. The data associated with the record may be automatically or manually modified, e.g., scaled, truncated, extended, changed, or otherwise adjusted in order to provide a meaningful transition between adjacent sections of data. The playback file is then generated using the amended log file.

Figure 10:
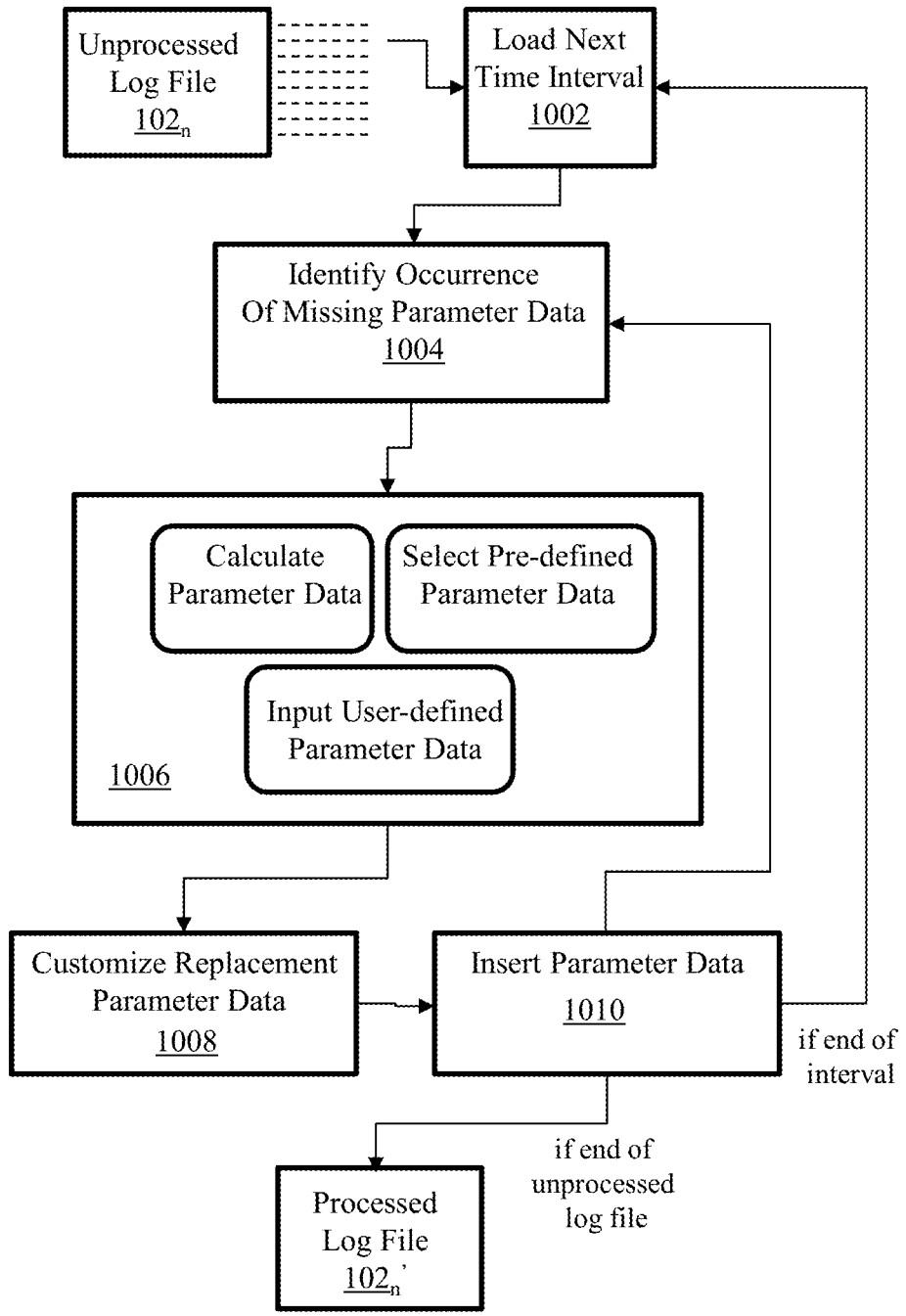
FIG. 10 illustrates a method for processing a log file.

FIG. 10 illustrates a method for processing a log file. Data corresponding to an interval of time which is less than the total time of an unprocessed log file $102_n$ is loaded for analysis in step 1002. The time interval may be a function of available processing and memory resources. The data associated with the loaded time interval is then evaluated to determine whether any parameter data is missing. More particularly, each parameter is parsed to identify an occurrence of missing parameter data in step 1004. If an occurrence is identified then substitute data associated with the corresponding parameter is provided in step 1006. The substitute parameter data may be provided in any of various ways. For example, as described above, the data may be calculated, selected from a pre-defined data record, provided by the user, or any combination thereof. The resulting substitute parameter data may then be customized in step 1008, e.g., scaled, truncated, extended, changed, or otherwise adjusted in order to provide a meaningful transition between adjacent sections of data by either or both the user and an algorithm. The provided and optionally customized substitute parameter data is then inserted into an output log file in place of the missing segment of parameter data in step 1010. For example, if power measurement data is missing from time t2 to t5 then substitute power measurement data is inserted into the log file for time t2 to t5. This process is repeated for each occurrence of missing data, and also for each interval of time, until the entire log file has been processed. The processed output log file $102_n'$ is then used for event recognition and selection 300 (FIG. 3) as already described above.

Various aspects of the invention may be implemented by computer program code that is stored in non-transitory memory. The computer program code may be used by processing hardware to accomplish steps and functions such as those described below to facilitate evaluating wireless devices.

While the invention is described through the above exemplary embodiments, it will be understood by those of ordinary skill in the art that modifications and variations may be made without departing from the inventive concepts. Further, while the embodiments are described in connection with various illustrative structures, one skilled in the art will recognize that the system may be embodied in connection with other structures. Accordingly, the invention should not be viewed as limited except by the scope and spirit of the appended claims.

What is claimed is:

1. A method comprising:
using a computer,
identifying an occurrence of parameter data to be replaced in a file indicative of wireless network conditions;
providing substitute parameter data corresponding to the occurrence of parameter data to be replaced;
replacing the occurrence with the substitute parameter data; and
using a channel emulator, recreating wireless network conditions based on a corresponding file generated with the substitute parameter data.

2. The method of claim 1 wherein the file is a log file, the corresponding file is a playback file, and the parameter data includes at least one of power measurements, interference, noise, signal-to-noise ratio, received signal strength indicator, and multipath Power-Delay-Profile, MIMO correlation, cell information, sector information, location information, data rate, throughput, wireless channel signal quality, and handoff parameters, and including the further step of generating the playback file using the log file.

3. The method of claim 2 wherein providing substitute parameter data includes calculating the substitute parameter data based on parameter data in the log file.

4. The method of claim 2 wherein providing substitute parameter data includes selecting the substitute parameter data from a set of predefined data records.

5. The method of claim 2 wherein providing substitute parameter data includes receiving the substitute parameter data as user input via an interface.

6. The method of claim 1 including the further step of modifying the substitute parameter data in accordance with user input provided via an interface.

7. The method of claim 6 wherein modifying the substitute parameter data includes one or more of scaling, truncating, extending, changing, and adjusting the substitute parameter data.

8. The method of claim 1 wherein identifying an occurrence of parameter data to be replaced includes identifying missing packets.

9. The method of claim 1 wherein identifying an occurrence of parameter data to be replaced includes identifying gaps associated with compressed mode operation.

10. Apparatus comprising:
computing resources which identify an occurrence of parameter data to be replaced in a file indicative of wireless network conditions, provide substitute parameter data corresponding to the occurrence of parameter data to be replaced, and replace the occurrence with the substitute parameter data; and
a channel emulator which recreates wireless network conditions based on a corresponding file generated with the substitute parameter data.

11. The apparatus of claim 10 wherein the file is a log file, the corresponding file is a playback file, and the parameter data includes at least one of power measurements, interference, noise, signal-to-noise ratio, received signal strength indicator, and multipath Power-Delay -Profile, MIMO correlation, cell information, sector information, location information, data rate, throughput, wireless channel signal quality, and handoff parameters, and wherein the playback file is generated from the log file.

12. The apparatus of claim 11 wherein substitute parameter data is calculated based on parameter data in the log file.

13. The apparatus of claim 11 wherein substitute parameter is selected from a set of predefined data records.

14. The apparatus of claim 11 wherein substitute parameter data is received as user input via an interface.

15. The apparatus of claim 10 including an interface via which the substitute parameter is modified in accordance with user input.

16. The apparatus of claim 15 wherein the substitute parameter data is modified by one or more of scaling, truncating, extending, changing, and adjusting the substitute parameter data.

17. The apparatus of claim 10 wherein the occurrence of parameter data to be replaced is associated with missing log file packets.

18. The apparatus of claim 10 wherein the occurrence of parameter data to be replaced is associated with gaps associated with compressed mode operation.

19. A computer program on a non-transitory computer-readable medium comprising:
instructions used by a computer to identify an occurrence of parameter data to be replaced in a file indicative of wireless network conditions, provide substitute parameter data corresponding to the occurrence of parameter data to be replaced, and replace the occurrence with the substitute parameter data; and
instructions used by a channel emulator to recreate wireless network conditions based on a corresponding file generated with the substitute parameter data.

20. The program of claim 19 wherein the file is a log file, the corresponding file is a playback file, and the parameter data includes at least one of power measurements, interference, noise, signal-to-noise ratio, received signal strength indicator, and multipath Power-Delay -Profile, MIMO correlation, cell information, sector information, location information, data rate, throughput, wireless channel signal quality, and handoff parameters, and including instructions used by the computer for generating the playback file using the log file.

21. The program of claim 20 wherein the instructions used by the computer to provide substitute parameter data include instructions which calculate the substitute parameter data based on parameter data in the log file.

22. The program of claim 20 wherein the instructions used by the computer to provide substitute parameter data include instructions which select the substitute parameter data from a set of predefined data records.

23. The program of claim 20 wherein the instructions used by the computer to provide substitute parameter data include instructions which utilize substitute parameter data provided as user input via an interface.

24. The program of claim 19 including instructions which modify the substitute parameter data in accordance with user input provided via an interface.

25. The program of claim 24 including instructions for one or more of scaling, truncating, extending, changing, and adjusting the substitute parameter data.

26. The program of claim 19 wherein the instructions which identify an occurrence of parameter data to be replaced include instructions which identify missing packets.

27. The program of claim 19 wherein the instructions which identify an occurrence of parameter data to be replaced include instructions which identify gaps associated with compressed mode operation.

* * * * *